US007979456B2

(12) United States Patent  (10) Patent No.: US 7,979,456 B2
Dettinger et al.  (45) Date of Patent: Jul. 12, 2011

(54) METHOD OF MANAGING AND PROVIDING PARAMETERIZED QUERIES

(75) Inventors: Richard D. Dettinger, Rochester, MN (US); Dan P. Kolz, Rochester, MN (US); Richard J. Stevens, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1988 days.

(21) Appl. No.: 10/821,149

(22) Filed: Apr. 8, 2004

(65) Prior Publication Data

US 2005/0234878 A1  Oct. 20, 2005

(51) Int. Cl.
*G06F 17/30* (2006.01)
*G06F 7/00* (2006.01)
(52) U.S. Cl. ........................................................ 707/765
(58) Field of Classification Search ................... 707/765
See application file for complete search history.

(56) References Cited

U.S. PATENT DOCUMENTS

| 6,725,227 B1 | 4/2004 | Li |
| 2003/0172056 A1 | 9/2003 | Dettinger et al. |
| 2005/0171934 A1* | 8/2005 | Yuknewicz et al. ............. 707/3 |

FOREIGN PATENT DOCUMENTS

| EP | 0627692 A1 | 12/1994 |
| EP | 1394696 A2 | 3/2004 |
| WO | 02/46916 A2 | 6/2002 |

OTHER PUBLICATIONS

"Microsoft SQL Server 2000 Reporting Services", Product Evaluation Guide, Jan. 2004, pp. 1-23, XP002372901.
Qian, et al, "Abstraction and Inheritance of HyperLinks in an Object-Oriented Hypertext Database System Textlink/Gem", IEICE Transactions on Information and Systems, Nov. 1995, No. 11, Tokyo, JP, XP000553521.
"Powerplay Enterprise Server Guide", Cognos Software Documentation, Apr. 24, 2002, XP002367963.

* cited by examiner

*Primary Examiner* — Jacob F Bétit
(74) *Attorney, Agent, or Firm* — Patterson & Sheridan, LLP

(57) ABSTRACT

Methods, systems and articles of manufacture for managing parameterized queries and making them available to users based on associations between parameterized queries and fields belonging to result sets are provided. By associating fields with parameterized queries, a query manager can be configured to provide users with a contextually appropriate selection of parameterized queries that can be used to obtain data related to objects in a result set. The selection of parameterized queries may be provided to users via a variety of interfaces including graphic interfaces and plug-in components utilized by external applications.

17 Claims, 11 Drawing Sheets

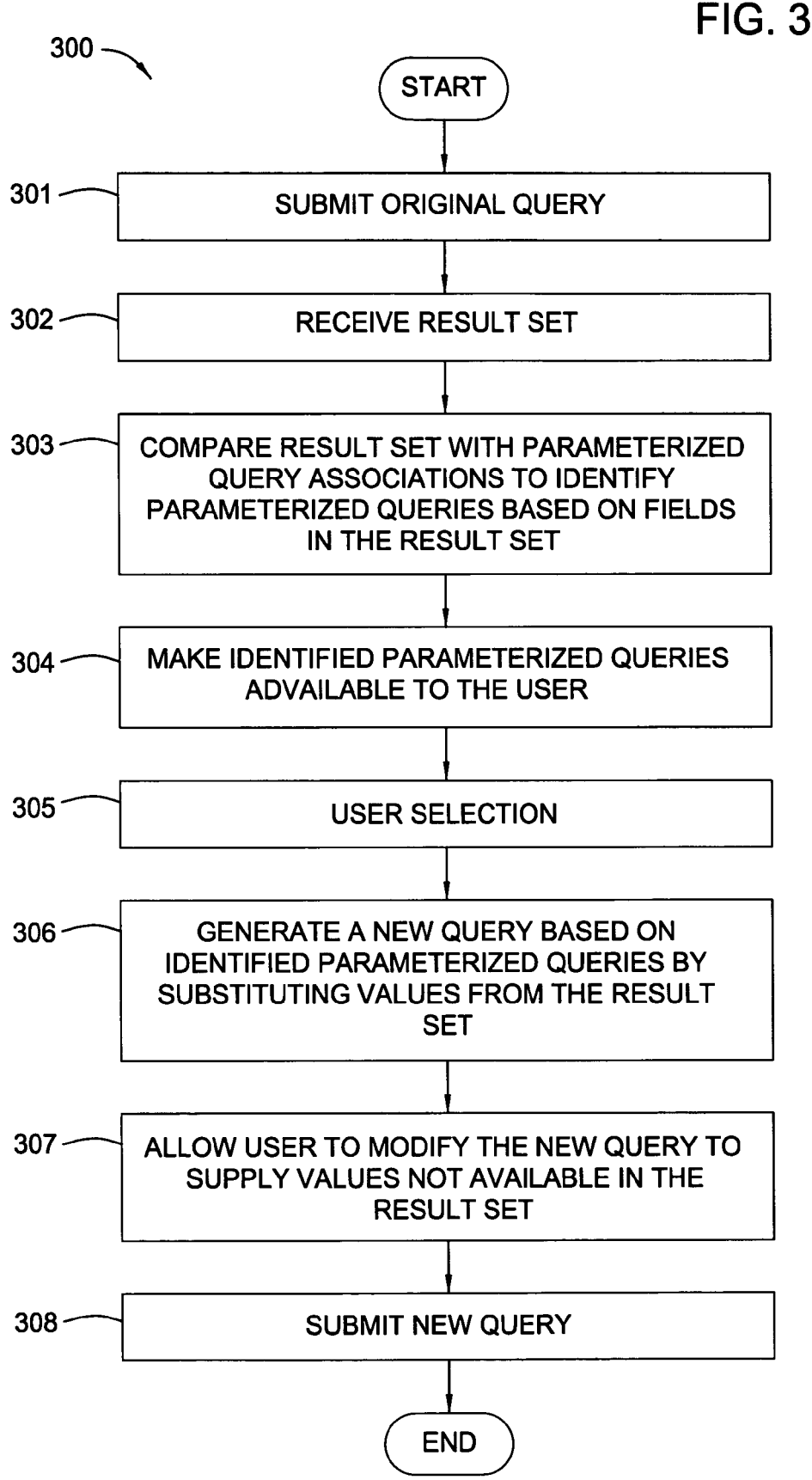

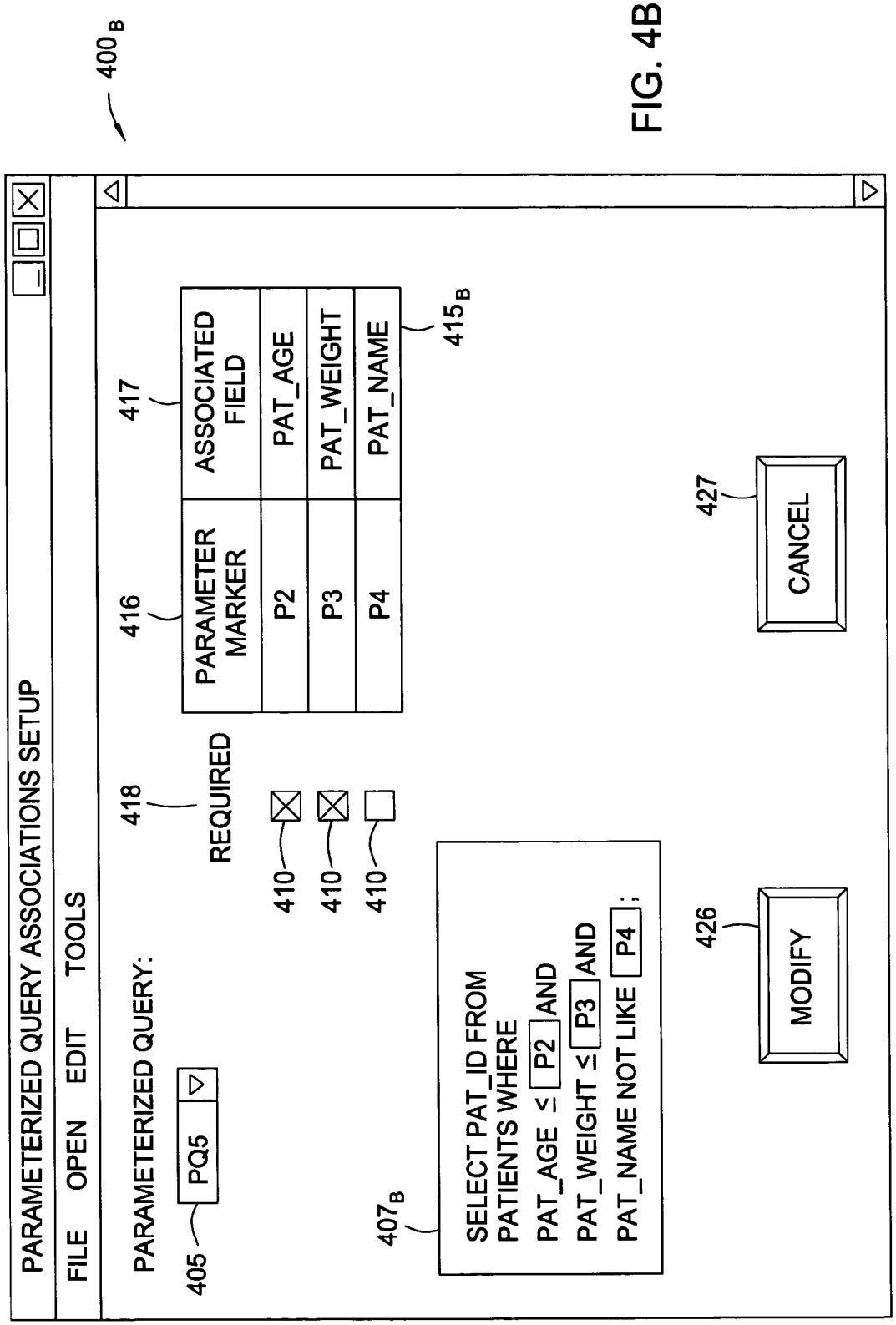

METHOD OF MANAGING AND PROVIDING PARAMETERIZED QUERIES

BACKGROUND OF THE INVENTION

1. Field of the Invention

The present invention generally relates to data processing and more particularly to the management and use of parameterized queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Queries are constructed of query conditions that serve to filter results returned from the query. Accordingly, a query may be thought of as group of filters put together to sift out only the data in which users are interested. Often, it may be desirable to modify one or more of the query conditions and re-execute the query to determine the effects of the query condition on the results returned. Some high level query languages provide support for parameter markers which allow SQL statements to be generic and reused, allowing for easy modification.

Users can run queries to get a result set, which comprise one or more columns (or fields) of data. Usually, each column in the result set is just a column of text or numbers arranged under a column heading. However, each column in the result set corresponds to a specific field. This field, in the mind of a user, may represent an object which has detailed information associated with it. For instance, suppose that a user has submitted a query against the PATIENTS table and one of the fields included in the query is PAT_ID (short for "Patient ID"). For the user, PAT_ID may represent the patient themselves. The PAT_ID field would be the starting place for any search for detailed information about a particular patient. Currently, there is not an easy way to get detailed information about an object that a field represents.

There are several less than optimal ways a user can get detailed information about the object a field represents. One approach is that the user can remember or write down the identifier of the object they are interested in. They would then create a new query with a condition in that query where the field in question is equal to the identifier. They could then add all of the information they wish to see about the object to the set of result fields. Continuing with the example of finding information about a patient, the user would first remember the patient id, then create a new query with a condition that has the PAT_ID field equal to the appropriate PAT_ID value that they type in. Next, they would find additional fields with interesting data about a particular patient and add them as result fields. Some exemplary fields might be related to the patient's name, address, and title. The above method of retrieving detail data is time consuming and needlessly repetitive.

Another approach is to provide parameterized queries to allow users to drill down into objects contained in the results set. The concept of parameterized queries can be described with reference to the following simple query:

Select*from employeeTable where gender='M'

The query returns a list of all male employees listed in a table employeeTable. The query may be rewritten as:

Select*from employeeTable where gender=?

The question mark replacing the 'M' represents a parameter marker and instructs the database engine that this specific value (for gender) will be provided later. By making this change, this single query can be used for selecting all the male employees or all the female employees, by setting the parameter marker to 'M' or 'F', respectively. Thus, a parameterized query is a query in which a parameter marker is included in place of a value. A value may be later substituted for the parameter marker to generate an executable query.

For purposes of getting detailed information about an object, users can utilize parameterized queries to drill down into objects returned in the results set by passing specific values from the result set to the parameterized query and submitting the parameterized query. While use of parameterized queries would be advantageous for users, they would have a difficult time identifying the appropriate parameterized query to use for getting detailed information about a specific object. In other words, users may not be aware of that a parameterized query associated with a specific type of data object even exists. Further, the task of creating and managing parameterized queries can be cumbersome and difficult.

Therefore, there is a need for improved methods of providing users more efficient processes for getting detail data about an object via parameterized queries. There is a further need for a solution that minimizes reliance on administrators, but still provides only those parameterized queries that are contextually relevant to data selected by users.

SUMMARY OF THE INVENTION

The present invention generally provides methods, articles of manufacture and systems for managing parameterized queries and making them available to users based on associations between parameterized queries and fields referenced by the results set.

For some embodiments, a method for automatically presenting a user with parameterized queries generally includes providing an interface presenting the user with a results set comprising a plurality of fields, identifying one or more parameterized queries associated, each associated with one or more of the plurality of fields, and providing the user access to the identified parameterized queries from the interface.

For some embodiments, a method for providing a user with access to parameterized queries generally includes associating one or more fields with one or more parameterized queries containing parameter markers in conditions containing the one or more fields, analyzing a results set presented to identify parameterized queries associated with fields contained therein, presenting a user with a list of one or more identified parameterized queries, and generating a new query by substituting, for one or more parameter markers in at least one of the identified parameterized queries, one or more values from the results set.

For some embodiments, the article of manufacture generally includes a computer-readable medium containing a program which, when executed by a processor, performs operations for accessing data. The operations generally include providing an interface presenting the user with a results set comprising a plurality of fields, identifying one or more parameterized queries, each associated with one or more of the plurality of fields, and providing the user access to the identified parameterized queries from the interface.

For some embodiments, the data processing system generally includes a plurality of parameterized queries, each including at least one condition involving at least one parameter marker, a set of parameterized query associations, each specifying one or more fields associated with one of the parameterized queries, and an executable component configured to examine a results set obtained in response to issuing a first query, examine the set of parameterized query associations to identify parameterized queries associated with fields in the results set, and provide an indication of the identified parameterized queries to a user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 3 is a flow chart illustrating exemplary operations for utilizing parameterized queries according to one embodiment of the present invention.

FIGS. 4A and 4B are exemplary graphical user interface (GUI) screens configured to be used by administrators, according to one embodiment of the present invention.

DETAILED DESCRIPTION OF THE PREFERRED EMBODIMENTS

Figure 1:
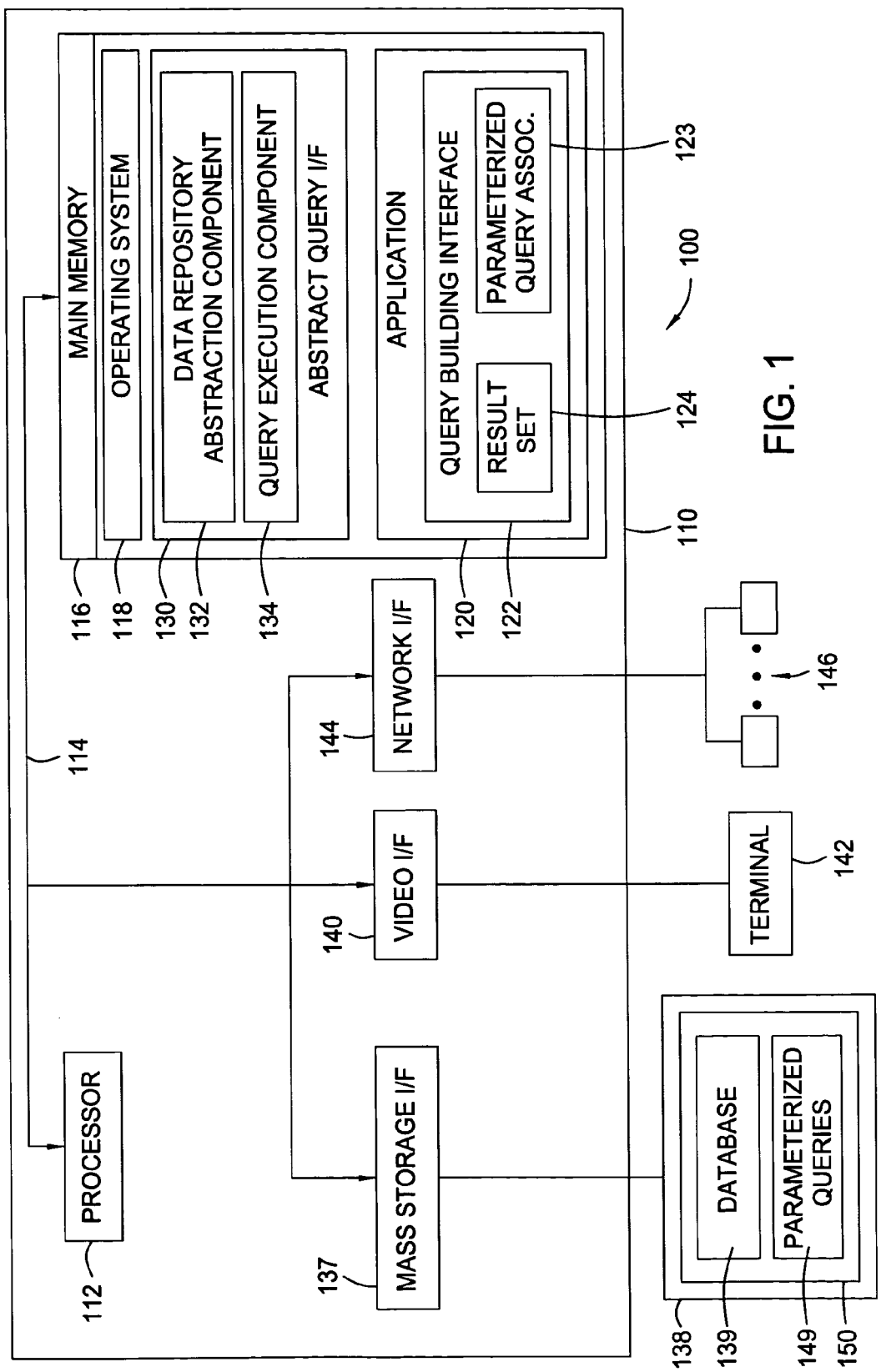
FIG. 1 is a computer system illustratively utilized in accordance with the present invention.

The present invention provides a method, system and article of manufacture for managing parameterized queries and making them available to users based on associations between parameterized queries and fields contained in a current results set. By associating fields with parameterized queries, the system can be configured to automatically provide a user with a contextually appropriate selection of parameterized queries that can be used to drill down into objects (i.e., learn more about objects) represented in a results set. As the phrase "contextually appropriate" implies, only relevant parameterized queries that allow for the drilling down into objects represented in the result set may be presented to the user. For some embodiments, parameter markers included in the parameterized queries presented to the user may be automatically filled in with data from the results set, thus facilitating building an executable query.

As used herein, the term parameterized query generally refers to a query in which a parameter marker is included in place of a value. A value may be later substituted for the parameter marker to generate an executable query. As used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

Exemplary Application Environment

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM's OS/400®, UNIX, Microsoft's Windows®), and the like.

The memory 116 further includes one or more applications 120 and, for some embodiments, an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention.

The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to a query building interface 122 included with each application 120. The queries issued by the applications 120 may be predefined (i.e., hard coded as part of the applications 120) or may be generated in response to input (e.g., user input). In some cases, the queries (referred to herein as "abstract queries") are composed using logical fields defined by the abstract query interface 130. In particular, the logical fields used in the abstract queries are defined by a data repository abstraction component 132 of the abstract query interface 130. The abstract queries are executed by a query execution component 134 which transforms the abstract queries into a form consistent with the physical representation of the data contained in the database 139.

The query building interface 122 may also receive a results set 124 (returned in response to a submitted query) and parameterized query associations used to associate fields in a results set with available parameterized queries 149. The query building interface 122, parameterized queries 149 and parameterized query associations 123 are further described with reference to FIGS. 2A and 2B.

An Exemplary Runtime Environment

Figure 2A:
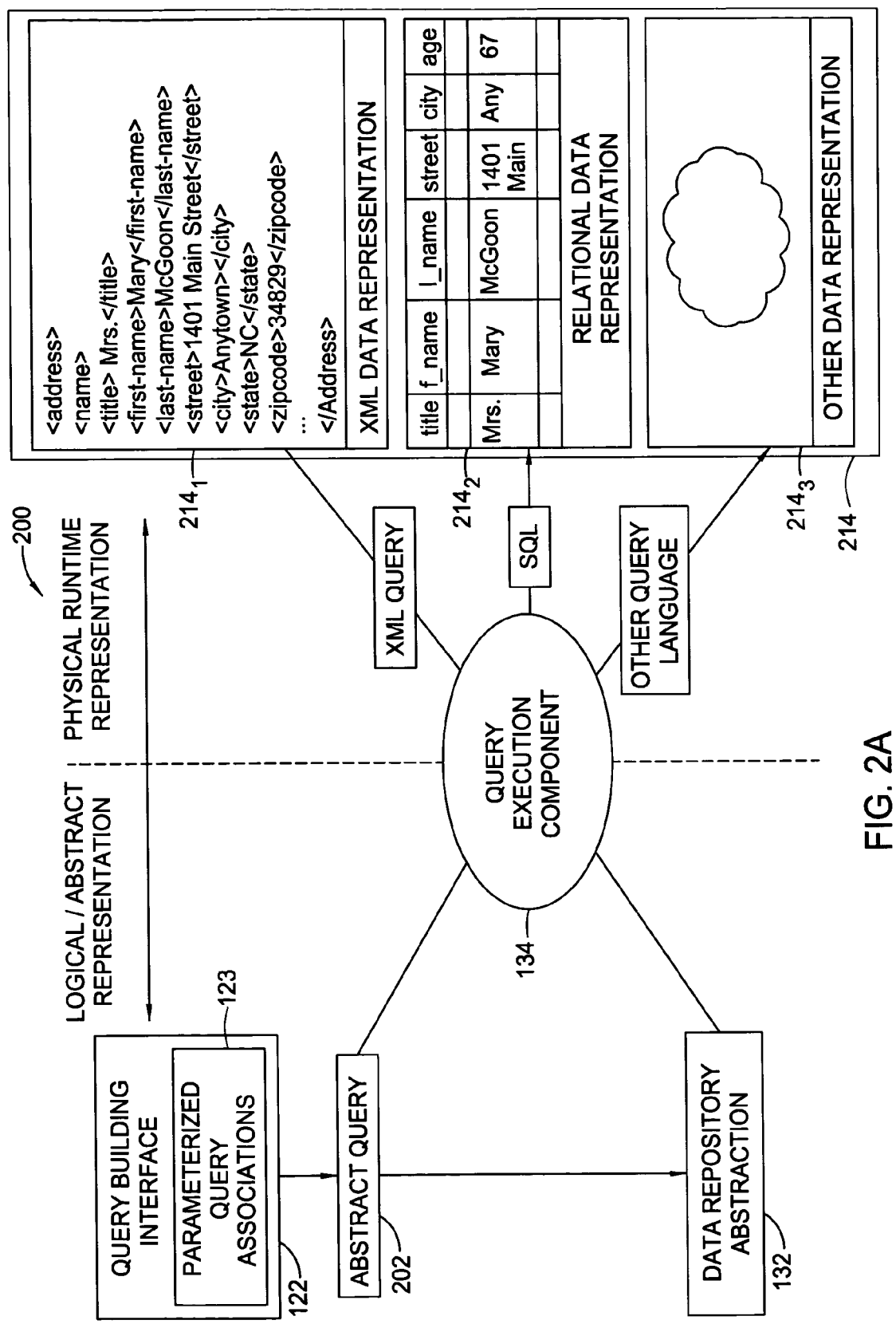
FIGS. 2A and 2B provide a relational view of software components, including a query building interface and parameterized query associations according to one embodiment of the present invention.
Figure 2B:
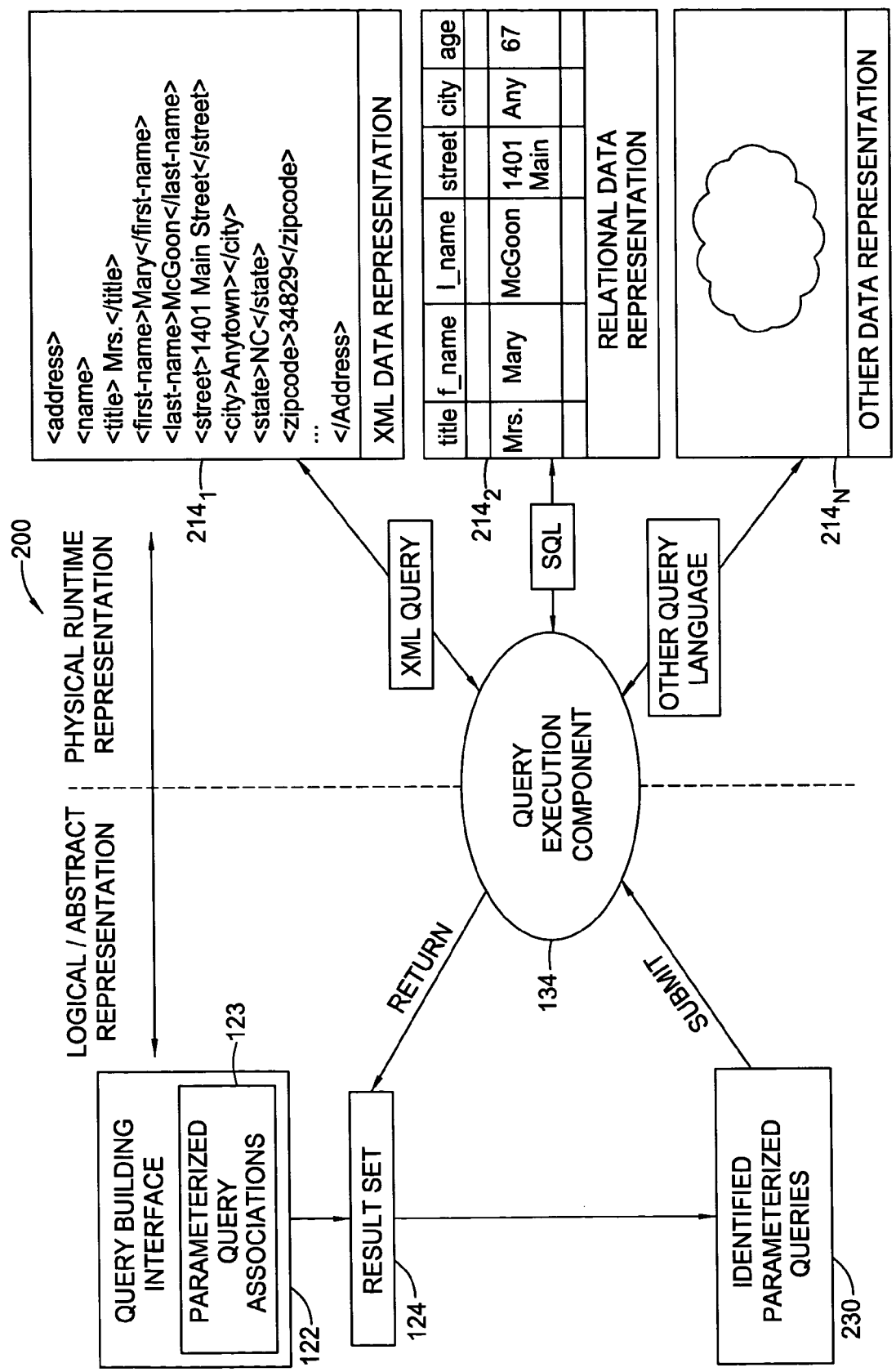

FIGS. 2A and 2B provide a relational view of software components, including parameterized query associations and a query execution runtime, of one embodiment of the present invention. Both FIG. 2A and FIG. 2B may be described with reference to FIG. 3 which is a flow diagram of exemplary operations 300 that may be performed to provide users with parameterized queries based on the result set 124. At step 301, an original (abstract query 202) query is submitted to the query execution component 134.

As illustrated, the original query may be generated by the query building interface 122. For some embodiments, the queries (referred to herein as "abstract queries") may be composed using logical fields defined by the query building interface 122. In particular, the logical fields used in the abstract queries 202 are defined by a data repository abstraction component 132. The abstract queries 202 are executed by a query execution component 134 which transforms the abstract queries into a form (referred to herein as a concrete query) consistent with the physical representation (e.g., XML, SQL, or other type representation) of the data contained in one or more of the databases 139. The queries may be configured to access the data and return results, or to modify (i.e., insert, delete or update) the data.

Abstract queries may be executed by the query execution component 134. In the exemplary abstract data model, the logical fields are defined independently of the underlying data representation being used in the DBMS 150, thereby allowing queries to be formed that are loosely coupled to the underlying data representation 214. The query execution component 134 is generally configured to transform abstract queries into concrete queries compatible with the physical data representation (e.g., an XML representation $214_1$, an SQL representation $214_2$, or any other type of representation $214_3$), by mapping the logical fields of the abstract queries to the corresponding physical fields of the physical data representation 214. The mapping of abstract queries to concrete queries, by the query execution component 150, is described in detail in the commonly owned, co-pending U.S. patent application Ser. No. 10/083,075, entitled "Application Portability And Extensibility Through Database Schema And Query Abstraction," filed Feb. 26, 2002.

In any case, at step 302 a result set corresponding to the submitted query 202 is received from the query execution component 134. The result set comprises values associated with one or more fields from the query 202. FIG. 2B illustrates the relational view of the system after the query 202 described in FIG. 2A is executed and the query result set 124 is returned by the query execution component 134.

Identifying Relevant Parameterized Queries

As previously described, in the mind of a user, one or more fields in the results set may represent an object which has detailed information associated with it (such as a patient identified by a Patient ID). In other words, the Patient ID may be the starting place for a search for detailed information related to or describing a particular patient. Embodiments of the present invention, may facilitate such searching by automatically presenting the user with a set of relevant parameterized queries, identified by previously defined associations with fields that are contained in the results set.

For example, referring back to FIG. 3, at step 303 the fields in the result set are compared with parameterized query associations 123. Matches between the fields in the result set 124 and parameterized query associations 123 indicate the existence of parameterized queries 149 associated with the fields in the results set 124. As seen in FIG. 2B, the analysis described above yields a list of identified parameterized queries 230.

The identified queries 230 in step 303 are presented to the user at step 304. At step 305, the user is allowed to select a parameterized query from the collection of identified queries 230. It should be noted that if only one identified query is available, it is automatically selected for the user. Once a parameterized query has been selected, a new query is generated at step 306, based on the selected parameterized query. Parameters in the new query are replaced with the appropriate values corresponding to the associated field from the results set 124. It should be noted that the results set 124 may not contain values to replace all the parameters of the selected query 230. At step 307, the user is allowed to modify the new query by supplying any needed values via an interface. Once modification of the new query is complete, the new query is submitted to the query execution component 134 at step 308. In one embodiment, steps 304 through 307 may be implemented through the use of GUI screens that will be discussed below in detail with reference to FIG. 5A-5D.

Associating Fields With Parameterized Queries

Figure 4A:
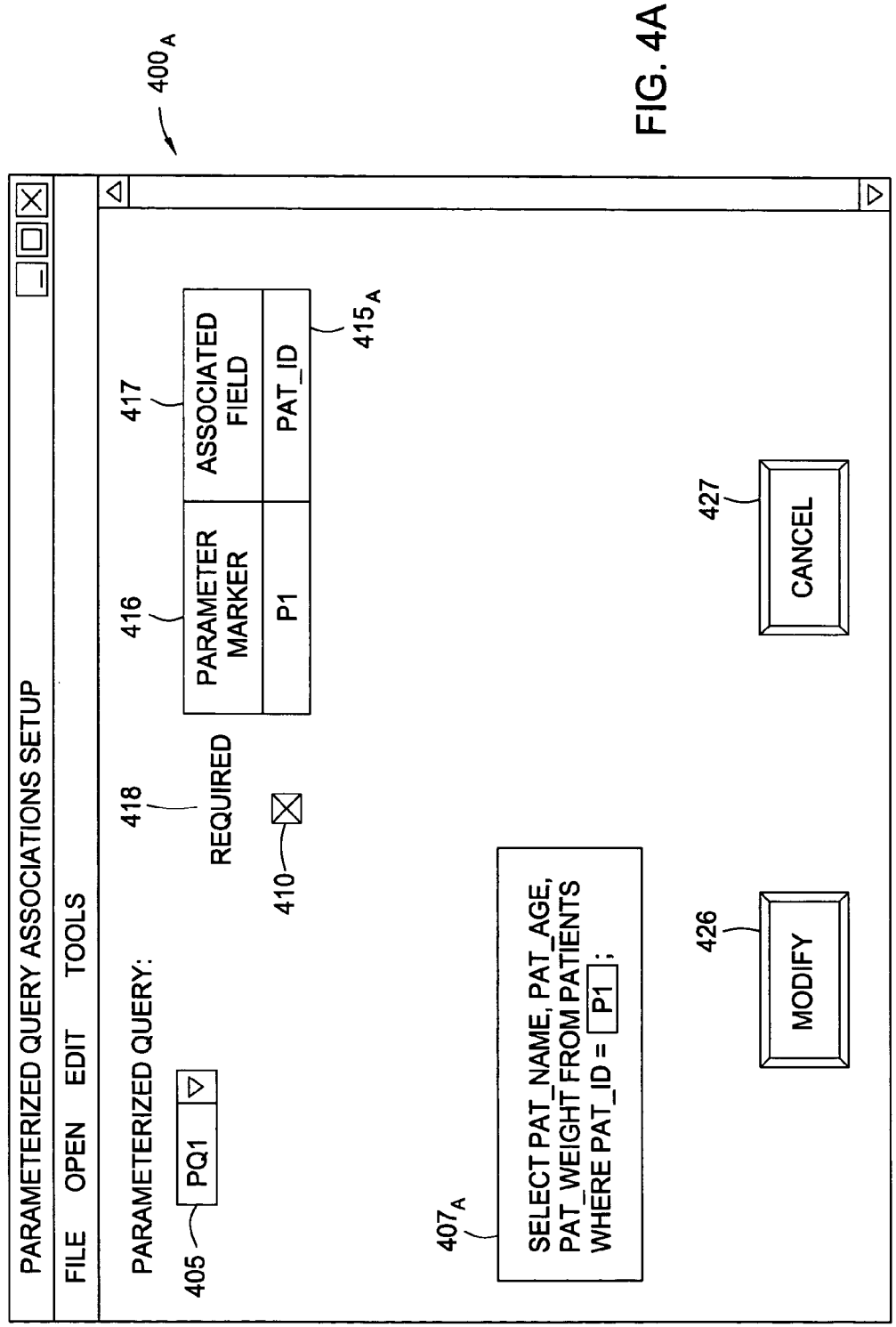

The parameterized query associations 123 of FIGS. 2A and 2B are mappings between fields and existing parameterized queries. For example, these mappings may be defined by a user (e.g., an administrator) via some type of interface, such as a GUI interface. FIG. 4A illustrates an exemplary GUI screen containing a parameterized query management window $400_A$ that may be used by administrators to create and manage parameterized query associations 123. A parameterized query drop down 405 is provided to allow administrators to select a particular parameterized query from a list of available parameterized queries 149. In the example of FIG. 4A, a parameterized query called "PQ1" is selected.

For purposes of describing FIG. 4A, sample syntax for the query P01 (short for "Patient Query 1") is shown below:

```
SELECT pat_name, pat_age, pat_weight
    FROM patients
    WHERE PAT_ID = P1;
```

It should be noted that while administrators may create parameterized queries, they would not necessarily need to build all available parameterized queries 149. Available parameterized queries 149 may be defined through other methods such as finding all queries which other end users have designated for public use. For example, available parameterized queries 149 may be associated with a user's work group or other level of authority. This enables a user to run queries written by others for other purposes but which apply to their own data of interest. While the administrator may not have to create all the available parameterized queries 149, they may review the queries to ensure that the query is defined properly (i.e., proper syntax, efficient execution plan).

Referring back to FIG. 4A, as shown, PQ1 contains 3 fields and 1 parameter marker (P1). A table $415_A$ listing parameter markers and associated fields of PQ1 is presented. Specifically, the table $415_A$ contains a Parameter column 416 and an Associated Field column 417. In the example of FIG. 4A, the PQ1 parameterized query contains one parameter, P1, which is associated with the PAT_ID field.

Using the parameterized query management window $400_A$, the administrator can associate a parameterized query to specific fields to by clicking the corresponding check box 410 in the REQUIRED column 418. If the associated field 417 is part of the result set, the current parameterized query will be presented to the user as an associated parameterized query. It should be noted that if multiple parameters are required, multiple check boxes will be checked. Accordingly, this parameterized query will be presented as an associated parameterized query only if the results set contains all required fields.

For the current example, the administrator specifies, by selecting the check box 410, that the field PAT_ID is required to be part of the results set 124 in order for the parameterized query PQ1 to be presented. Therefore, if PAT_ID is part of a results set 124 from an original query 202, the user will be presented with PQ1 as one of the parameterized queries available for running with the value from the PAT_ID field in the results set 124.

The syntax for the parameterized query selected via the dropdown 405 is presented in a query review box $407_A$. In the case of FIG. 4A, the syntax shown in the query review box $407_A$ is that of the parameterized query PQ1. In certain instances, the administrator may determine that the parameterized query needs to be modified. When selected, the MODIFY button 426 provides the parameterized query in an editable free-form text box, allowing the administrator to make all necessary changes and save the new version of the parameterized query. A CANCEL button 427 is also provided to allow the administrator to exit the current window without making any changes.

FIG. 4B illustrates another exemplary parameterized query management window $400_B$. It should be noted that the administrator has used the drop down 405 to select a new query, PQ5. Unlike PQ1 from FIG. 4A, PQ5 comprises three parameters P2, P3 and P4 associated with the fields PAT_AGE, PAT_WEIGHT and PAT_NAME respectively. As illustrated, a user has chosen only two fields, PAT_AGE and PAT_WEIGHT, as required fields in the results set 124. While the field PAT_NAME does have a parameter marker (P4) associated with it, PAT_NAME is not required to be part of the results set 124. Accordingly, only the check boxes 410 adjacent to PAT_AGE and PAT_WEIGHT are selected, while the check box 410 adjacent to PAT_NAME is not selected. Only the PAT_AGE and PAT_WEIGHT fields need to be available in the result set 124 of the original query 202 for PQ5 to be presented as a parameterized query. It should be noted that if PAT_NAME is available in the result set 124, its value may replace the corresponding parameter marker in PQ5. However, if a value for PAT_NAME is not available, a user supplied value for PAT_NAME will be used. This concept will be described later with reference to FIG. 5E.

Upon completion of the setup process, the specified associations allow for the parameterized queries to be automatically made available to users, as illustrated in the GUI screens of FIGS. 5A-5E. Users can utilize the available parameterized queries to explore details of the result set 124 returned from original queries 202. Window 500 illustrated in FIG. 5A, contains a result set 124 associated with an already submitted original query 202. The results set 124 includes a series of rows 503 and columns 504. Each row represents a database record that satisfies the requirements of the original query 202, and each column represents a field in the original query 202. In the case of the current example, 3 rows satisfy the requirements of the original query 202. Further, the original query 202 includes 3 fields: PAT_ID, PAT_AGE, and PAT_WEIGHT.

For the current example, data values for each of the fields and rows appear in a tabular format. Information for the three patients with PAT_ID values of "001", "002", and "003" are shown. The data values listed in a row describe the attributes of one patient. For example, the patient that has been assigned PAT_ID of 001 is 28 years of age and weighs 210 pounds.

Drilling Down into an Object of Interest

If the user wants to drill down into the objects represented by the fields in the results set 124, they can run available parameterized queries using data values from the results set 124. If an associated parameterized query is available for a particular field, the value displayed for the field will appear as a field based hyperlink 515. Hyperlinks are well known in the art to perform a series of operations when selected. Once the field based hyperlink 515 is selected, a corresponding parameterized query selection window 519, illustrated in FIG. 5B, is presented to allow users to select an appropriate parameterized query.

As described above, values in the patient ID field (PAT_ID) may represent actual patients to the user. To illustrate this, suppose the user wants to learn more about the patient with PAT_ID=001 from the current example. Upon selection of a field based hyperlink 515 for "001", a list of parameterized queries associated with the PAT_ID field is presented. Further, the value corresponding to the hyperlink selected from FIG. 5A (001) is imported into the value fields 528 associated with the PAT_ID based parameter. A parameterized query name column 521 is also presented which contains the names of the parameterized queries presented, or available.

For the current example, the available parameterized queries can be used to learn more about (or drill down into) the particular patient of interest (PAT_ID=001). Once a user has reviewed the queries, they can select a query to be run by clicking the corresponding SELECT button 520 located next to each parameterized query. Upon clicking a particular SELECT button 520, the user is presented with a Selected Parameterized Query window 529, illustrated in FIG. 5C, with values from the results set automatically substituted for parameter markers in the selected parameterized query.

As its name implies, the Selected Parameterized Query window 529 presents the selected parameterized query. In place of the parameters, the corresponding field value 528 from the results set 124 is filled in. The query is shown with functional syntax and is ready to be submitted. If satisfied with the query, the user can submit the query by selecting the SUBMIT button 530. However, if the user wants to modify the query, the MODIFY button 531 can be selected to present the query in an editable free-form text box in a new window. Those skilled in the art will appreciate that users may choose to modify query syntax for a variety of reasons including to improve resource utilization and to improve the formatting of data returned in the results set. Once the user is satisfied with the query syntax, the new query 527 can be submitted by selecting the SUBMIT button 530.

Figure 5A:
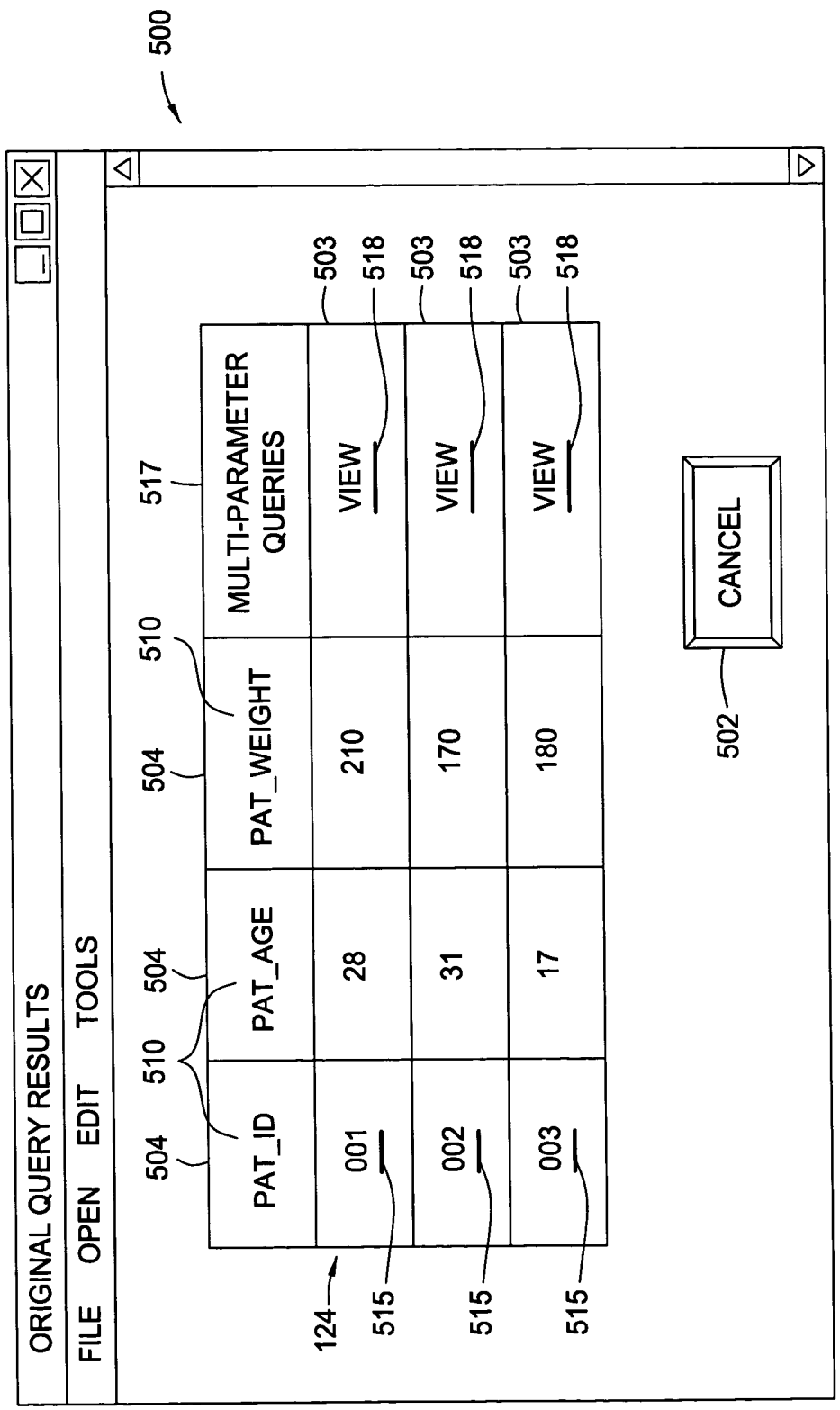
FIGS. 5A-5E are exemplary GUI screens configured to be used by users, according to one embodiment of the present invention.
Figure 5B:
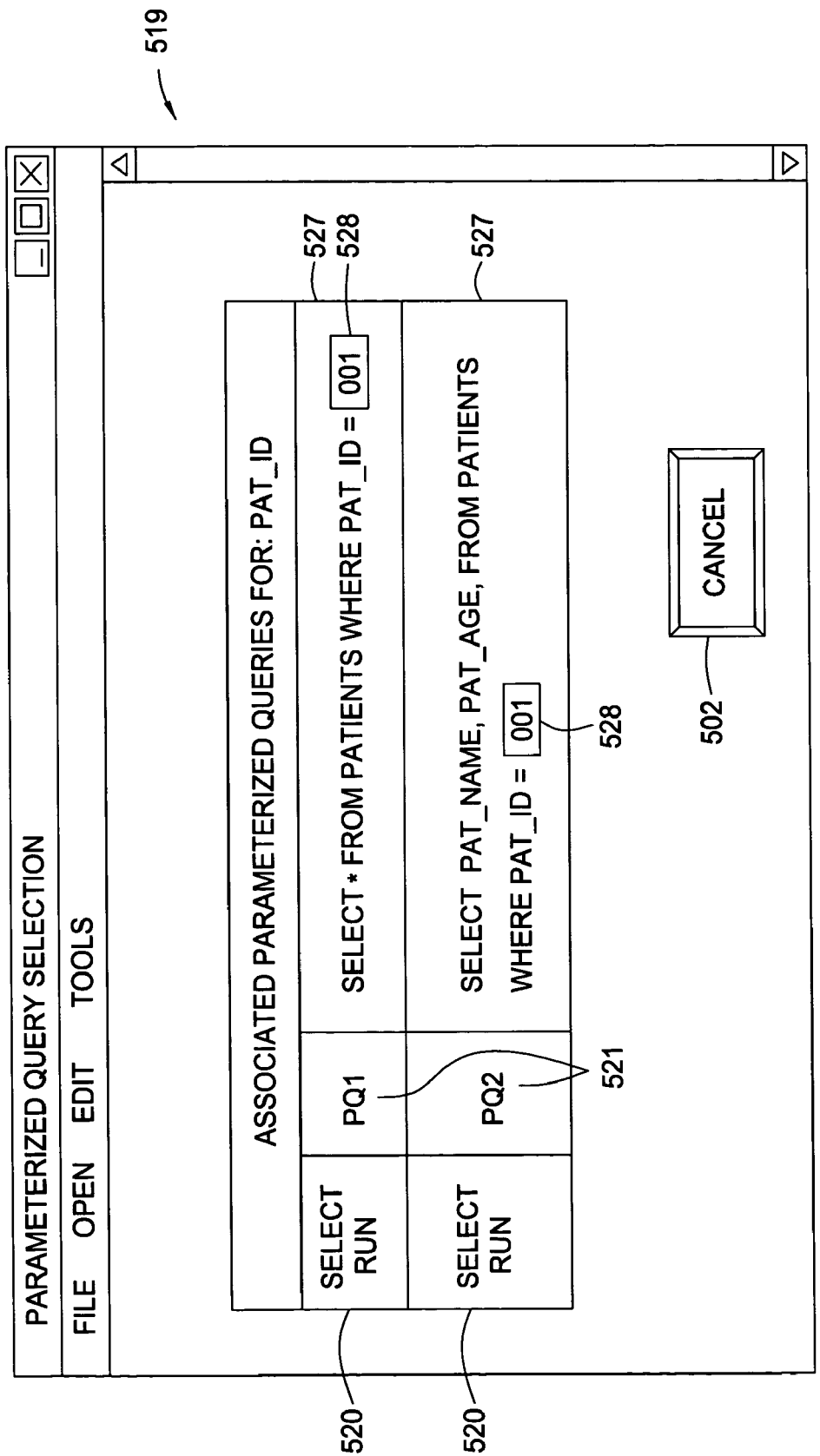
Figure 5C:
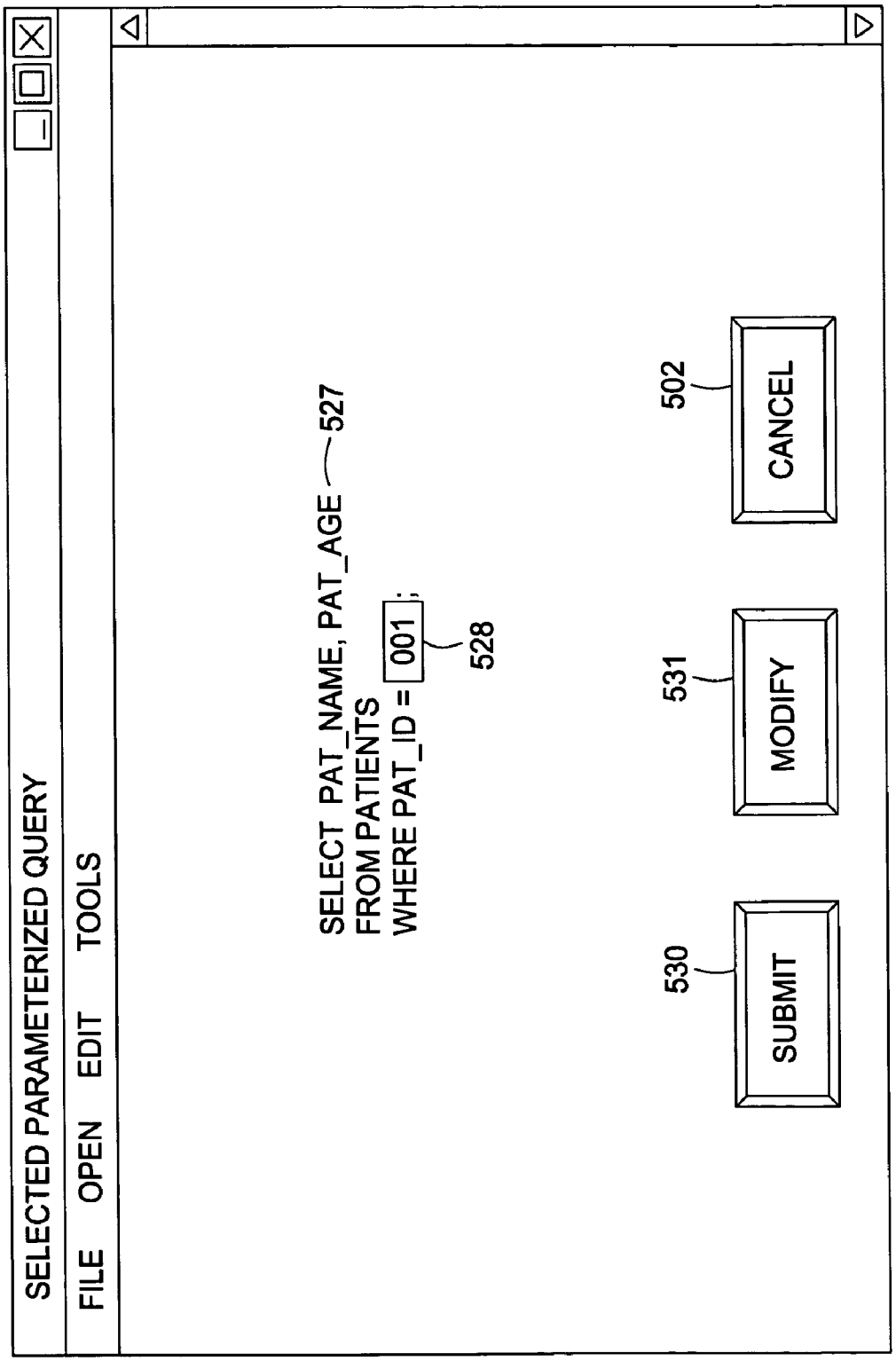
Figure 5D:
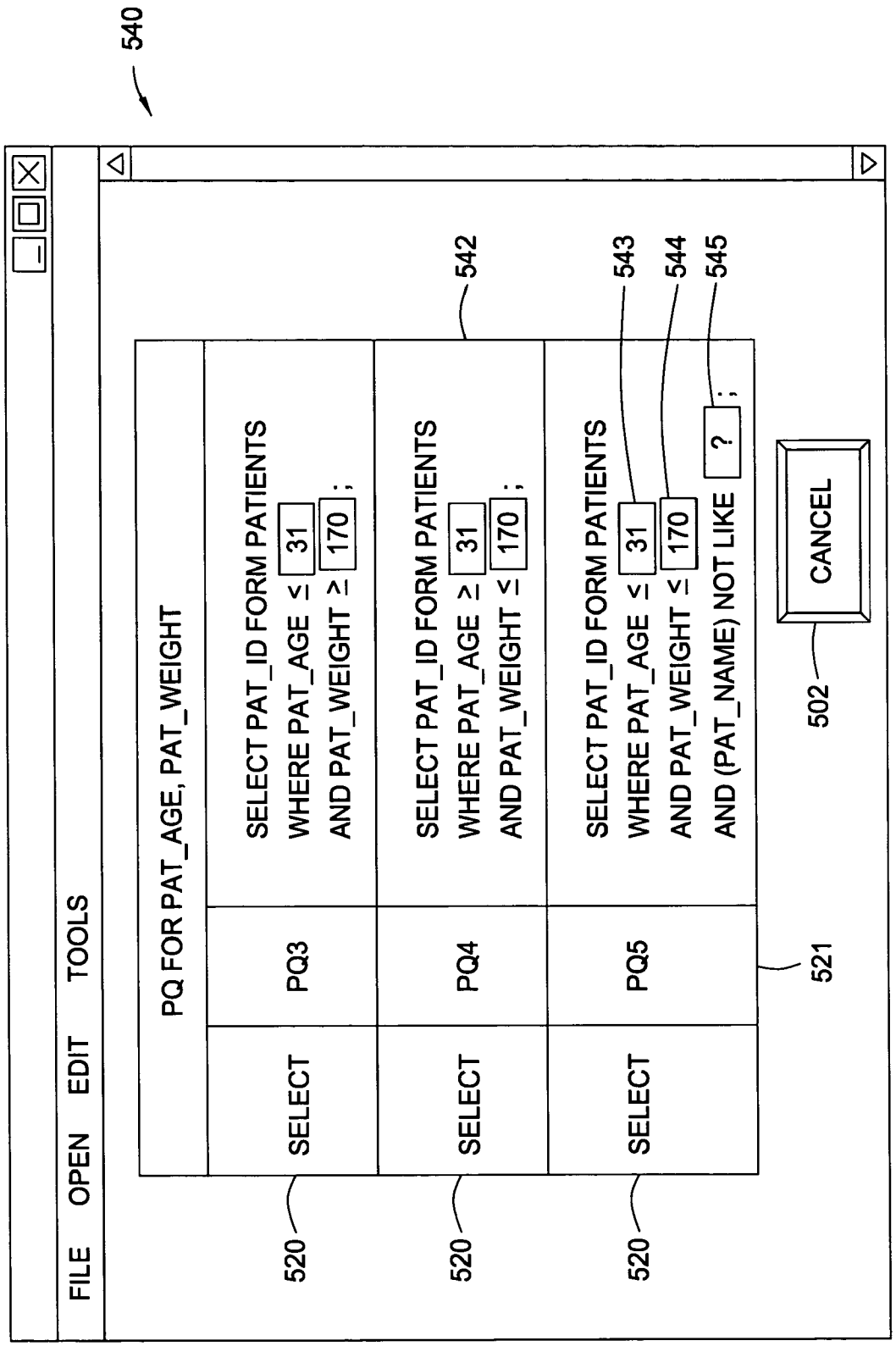

Going back to FIG. 5A, if parameterized queries exist for a combination of fields, a multi-field based hyperlink 518 is presented, for example, adjacent to the row in the results set 124. If a multi-field based hyperlink 518 is selected, a corresponding parameterized query selection window 540, illustrated in FIG. 5D, is presented to allow users to select an appropriate parameterized query. In accordance with the current example, the parameterized queries associated with the PAT_AGE and PAT_WEIGHT fields are presented. As illustrated, the corresponding field values 543 and 544 for PAT_AGE and PAT_WEIGHT respectively, in PQ5, are automatically populated.

Figure 5E:
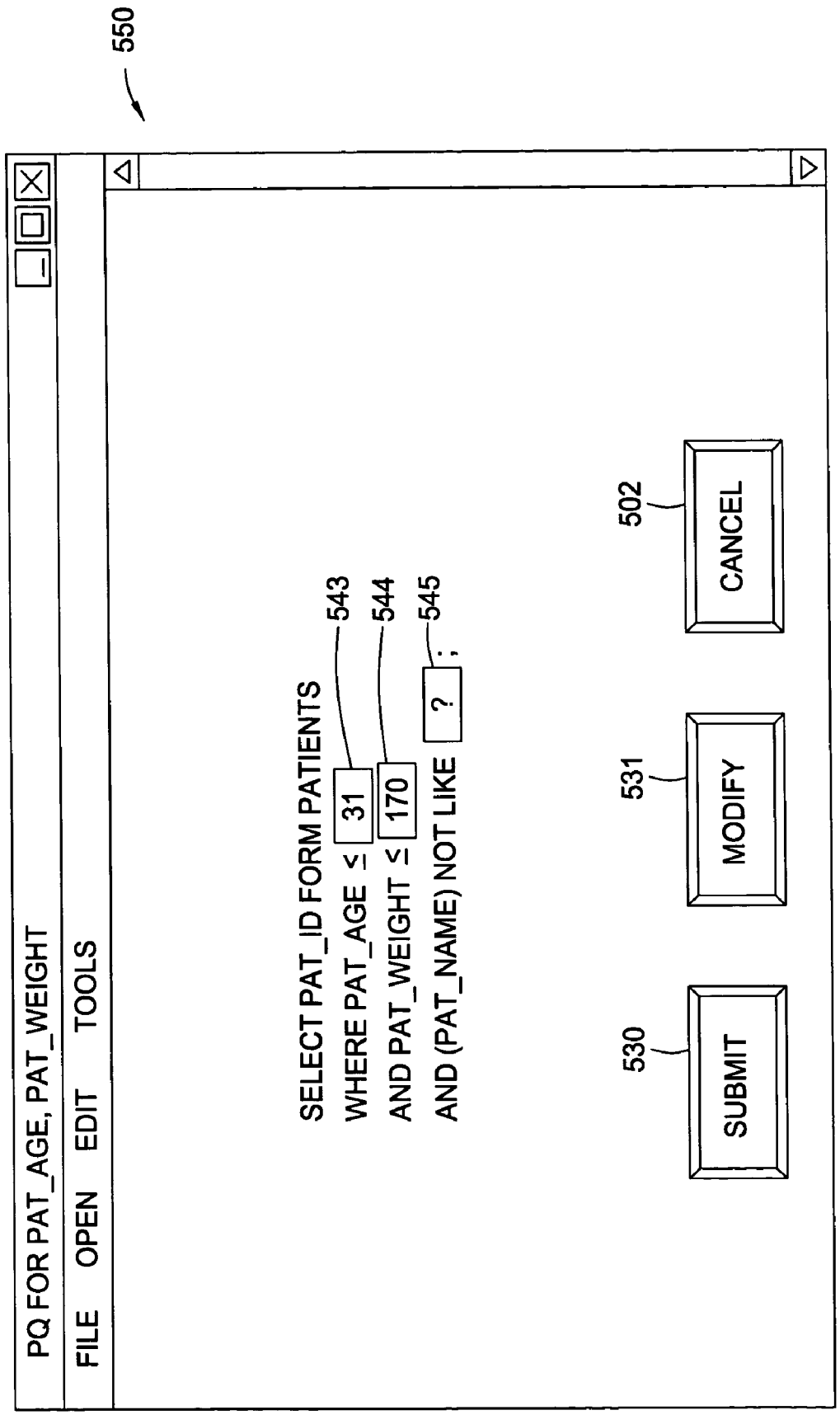

For the current example, suppose the user selects the parameterized query PQ5 by pushing the SELECT button 520 adjacent to PQ5. As a result, the Selected Parameterized Query window 550 illustrated in FIG. 5E is presented. Looking at FIG. 5E, it should be noted that the PAT_NAME value 545 needs to be provided by the user since it was not available from the results set. The user can provide the value by simply filling in the text box with the desired value for PAT_NAME. Those skilled in the art will understand that while a text box is shown, a drop down box or list box or other well known GUI elements can also be used to enter the desired value. If the user chooses to alter the query, the MODIFY button 531 can be selected. When satisfied with the query, the SUBMIT button 530 can be selected by the user to submit the query.

As discussed above, parameterized queries are made available if the required fields (e.g., as specified in a parameterized query association) are present in the results set 124. It should be noted that if fields that are not required to be part of the results set 124 are the only fields that are provided in the results set 124, the parameterized query may not be made available (e.g., the parameterized query may not be of particular interest). For instance, in the previous example, PQ5 is made available to the user if the required fields PAT_AGE and PAT_WEIGHT are present. Suppose, however, for a particular original query, only the PAT_NAME field is in the results set 124. In this case, PQ5 would not be presented because, while PAT_NAME is a field associated with a parameter utilized in PQ5, the required fields PAT_AGE and PAT_WEIGHT are not available.

It should also be understood that If only one parameterized query is associated with the fields in the results set 124, that particular parameterized query may be automatically selected. A new query based on the selected parameterized query may be automatically created with the parameters replaced with the appropriate value from the associated field in the results set 124. Further, once created, the new query may be automatically submitted to the query execution component 134.

While the examples above describe a single field value mapped to a particular parameter (i.e., a "one-to-one" correspondence between fields and parameters), it should be understood that for some embodiments, a parameter of a parameterized query may be replaced with multiple values associated with a particular field. For example, a parameterized query utilizing the well known SQL construct "IN" could have a parameter that would be associated with multiple values. When creating a new query based on such a parameterized query, multiple values from the results set may be substituted for the parameter. The multiple values may come from different fields, or from the same field in different rows.

For other embodiments, a parameter of a particular parameterized query may be replaced by values associated with multiple fields. For example, suppose there exists a parameterized query designed to aid in the analysis of a patient's blood pressure. It should be understood that this particular parameterized query would be able to accommodate both a "Minimum Pressure" field and "Maximum Pressure" field that may be available in a results set 124. Accordingly, an association may be created allowing the parameterized query to be presented if either of these fields are present in the results set.

CONCLUSION

By providing a system and method for efficiently supplying users with a contextually appropriate selection of parameterized queries that can be used to obtain data related to objects in a result set corresponding to existing queries, the user's experience with the database environment may be greatly enhanced.

The examples of parameterized queries described above are directed to reading data from a database for purposes of presenting data to users. However, those skilled in the art will recognize the methods described herein may be used with other types of database transactions (including inserts, updates, and deletes) that are configured to manage data in a database.

While the foregoing is directed to embodiments of the present invention, other and further embodiments of the invention may be devised without departing from the basic scope thereof, and the scope thereof is determined by the claims that follow.

What is claimed is:

1. A method for providing a user with access to parameterized queries, each having parameter markers for which parameter values may be substituted to generate executable queries, comprising:
    associating one or more fields with one or more parameterized queries containing parameter markers in conditions containing the one or more fields;
    analyzing a results set presented to identify parameterized queries associated with fields contained therein;
    presenting a user with a list of one or more identified parameterized queries; and
    generating an executable query by substituting, for one or more parameter markers in at least one of the identified parameterized queries, one or more values from the results set.

2. The method of claim 1, further comprising prompting the user for values to be substituted for parameter markers associated with fields not contained in the result set.

3. The method of claim 1, wherein associating one or more fields with one or more parameterized queries containing parameter markers in conditions containing the one or more fields comprises:
    specifying which fields contained in conditions having parameter markers are required to be contained in the results set before a corresponding parameterized query is presented to the user.

4. The method of claim 1, wherein:
    presenting a user with a list of one or more identified parameterized queries comprises presenting the user with a list of more than one parameterized query; and
    the method further comprises receiving a user selected one of the parameterized queries, wherein the new query is generated by substituting, for one or more parameter markers in the selected parameterized query, one or more values from the results set.

5. A method for automatically presenting a user with parameterized queries, each having parameter markers for which parameter values may be substituted to generate executable queries, comprising:
    providing an interface presenting the user with a results set comprising a plurality of fields;
    identifying one or more parameterized queries on the basis of an association between the one or more of the plurality of fields in the results set and the identified one or more parameterized queries, comprising
        comparing fields in the results set to one or more fields specified as required in a set of parameterized query associations, each corresponding to a parameterized query; and
        identifying a parameterized query only if each field, specified as required in a parameterized query association corresponding to the identified parameterized query, are contained in the result set; and
    providing the user access to the identified parameterized queries from the interface.

6. A search system for gathering detailed information about objects of interest, comprising:
    an interface for presenting, to a user, a results set received in response to issuing an original executable query, wherein the results set contains a field with one or more values representing objects of interest;
    a set of parameterized queries, each having one or more conditions containing at least one parameter marker for which a value may be substituted to generate an executable query;
    a set of parameterized query associations, each specifying one or more fields involved in conditions having parameter markers contained in a corresponding parameterized query in the set of parameterized queries; and
    an executable component configured to identify one or more of the parameterized queries only if each field, specified as required in one or more parameterized query associations corresponding to the identified parameterized queries, are contained in the result set.

7. The search system of claim 6, wherein the executable component is configured to present the user with one or more links to the identified parameterized queries from within the interface.

8. The search system of claim 7, wherein the executable component is configured to provide a parameterized query interface displaying at least one of the identified parameterized queries, in response to the user selecting one of the links.

9. The search system of claim 8, wherein the executable component is configured to substitute, for at least a first parameter marker contained in the at least one of the identified parameterized queries, at least one value contained in the results set.

10. The search system of claim 9, wherein the parameterized query interface prompts the user to provide a value to be substituted for at least a second parameter marker contained in the at least one of the identified parameterized queries.

11. The search system of claim 7, wherein, in response to the user selecting one of the links, the executable component is configured to automatically generate an executable query by substituting, for at least one parameter marker contained in a parameter marker associated with the selected link, at least one value from the results set.

12. A computer-readable storage medium containing a program for providing a user with access to parameterized queries having parameter markers for which parameter values may be substituted to generate executable queries which, when executed by a processor, performs operations comprising:

providing an interface presenting the user with a results set comprising a plurality of fields;

identifying one or more parameterized queries, each associated with one or more of the plurality of fields in the results set;

providing the user access to the identified parameterized queries from the interface; and providing an interface allowing a user to associate parameterized queries with fields, wherein the interface allows the user to specify one or more fields that are required to be contained in the results set before a corresponding parameterized query is presented to the user.

13. A data processing system, comprising:
a processor;
one or more computer-readable storage media containing:
(i) a plurality of parameterized queries, each including at least one condition involving at least one parameter marker for which parameter values may be substituted to generate an executable query; and
(ii) a set of parameterized query associations, each specifying one or more fields associated with one of the parameterized queries; and
an executable component which, when executed by the processor, is configured to examine a results set obtained in response to issuing a first query, examine the set of parameterized query associations to identify parameterized queries associated with fields in the results set, and provide an indication of the identified parameterized queries to a user.

14. The data processing system of claim 13, wherein the executable component is further configured to generate a second query by substituting values contained in the results set for one or more parameters for one of the identified parameterized queries.

15. The data processing system of claim 13, wherein the executable component is configured to:
provide a first interface to display the results set to a user; and
provide one or more links from within the first interface to a second interface indicating the identified parameterized queries.

16. The data processing system of claim 13, wherein the executable component is configured to generate a second query by substituting values contained in the results set for one or more parameters for one of the identified parameterized queries selected by the user.

17. The data processing system of claim 16, wherein the executable component is further configured to prompt the user for data to be substituted for one or more parameters of the selected parameterized query that is not contained in the results set.

* * * * *